(12) United States Patent
Gruner et al.

(10) Patent No.: US 7,918,216 B2
(45) Date of Patent: Apr. 5, 2011

(54) EXHAUST GAS RECIRCULATION DEVICE

(75) Inventors: Andreas Gruner, Hattenhofen (DE);
Robert Sendor, Wolfratshausen (DE);
Rudiger Knauss, Kernen I.r. (DE);
Bernhard Schwalk, Stuttgart (DE)

(73) Assignee: Mahle International GmbH (DE)

( * ) Notice: Subject to any disclaimer, the term of this patent is extended or adjusted under 35 U.S.C. 154(b) by 137 days.

(21) Appl. No.: 12/301,344

(22) PCT Filed: May 15, 2007

(86) PCT No.: PCT/EP2007/054686
§ 371 (c)(1),
(2), (4) Date: Nov. 18, 2008

(87) PCT Pub. No.: WO2007/135021
PCT Pub. Date: Nov. 29, 2007

(65) Prior Publication Data
US 2009/0188477 A1 Jul. 30, 2009

(30) Foreign Application Priority Data

May 19, 2006 (DE) .................... 10 2006 023 855

(51) Int. Cl.
*F02B 47/08* (2006.01)
*F02B 47/10* (2006.01)
(52) U.S. Cl. .................................. 123/568.12
(58) Field of Classification Search ............ 123/568.12, 123/568.11, 568.21; 701/108; 60/278, 280, 60/298, 605.2, 605.1; 165/103, 153, 158
See application file for complete search history.

(56) References Cited

U.S. PATENT DOCUMENTS

| 4,105,065 | A | * | 8/1978 | Chirico | 165/78 |
| 4,291,760 | A | * | 9/1981 | Argvle et al. | 165/166 |
| 4,972,903 | A | * | 11/1990 | Kwok | 165/158 |
| 5,732,688 | A | * | 3/1998 | Charlton et al. | 123/568.12 |
| 6,976,480 | B2 | * | 12/2005 | Miyoshi et al. | 123/568.12 |
| 2004/0107949 | A1 | | 6/2004 | Miyoshi et al. | |

FOREIGN PATENT DOCUMENTS
DE  69720661  11/1997
(Continued)

OTHER PUBLICATIONS
English abstract for JP-2006-29942.
(Continued)

*Primary Examiner* — Mahmoud Gimie
(74) *Attorney, Agent, or Firm* — Rader, Fishman & Grauer PLLC (57) ABSTRACT

The invention relates to an exhaust gas recirculation device (5) for an internal combustion engine (1), especially in a motor vehicle, said device comprising an exhaust gas recirculation line (6) and an exhaust gas cooler (7) which is built into the exhaust gas recirculation line (6) and connected to a cooling circuit (8) operating by means of a liquid coolant. The exhaust gas recirculation cooler (7) comprises a cooler housing (9) which comprises at least one exhaust gas inlet (10), an exhaust gas outlet (11), a coolant inlet (12) and a coolant outlet (13), and through which a coolant flows. In order to be able to improve the adjustment of the cooling power, the exhaust gas recirculation cooler (7) contains, in the cooler housing (9) thereof, a first cooling tube arrangement (14) and a second cooling tube arrangement (15) which enables a larger heating flow between the exhaust gas and the coolant than the first cooling tube arrangement (14).

18 Claims, 5 Drawing Sheets

FOREIGN PATENT DOCUMENTS

| | | |
|---|---|---|
| DE | 19962863.7 | 12/1999 |
| DE | 10344217 | 9/2003 |
| DE | 102004010117 | 2/2004 |
| EP | 1270921 | 2/2003 |
| JP | 2004-257366 | 9/2004 |
| JP | 2006-299942 | 11/2006 |
| WO | WO-96/30635 | 10/1996 |

OTHER PUBLICATIONS

English abstract for JP-2004-257366.
English abstract for DE-69720661.
English abstract for DE-19962863.
English abstract for DE-10344217.

* cited by examiner

EXHAUST GAS RECIRCULATION DEVICE

TECHNICAL FIELD

The present invention relates to an exhaust gas recirculation device for an internal combustion engine, especially in a motor vehicle.

BACKGROUND

In internal combustion engines, an exhaust gas recirculation is increasingly used to thereby improve the emission values and the efficiency of the internal combustion engine. To avoid here an increase of $NO_x$ emissions, it is necessary to cool the recirculated exhaust gases by means of an exhaust gas recirculation cooler, abbr. EGR cooler, since the $NO_x$ generation in the combustion process increases disproportionately high with increasing temperature.

Accordingly, an exhaust gas recirculation device, abbr. EGR device, of the type mentioned above comprises typically an EGR cooler which is built into an exhaust gas recirculation line, abbr. EGR line, and which is connected to a cooling circuit operating with liquid coolant. For this, the EGR cooler has a cooler housing, which comprises an exhaust gas inlet, an exhaust gas outlet, a coolant inlet and a coolant outlet, and through which a coolant flows.

From WO 96/30 635 A1 such an EGR device is known, which in addition is characterized in that it has a bypass externally bypassing the EGR cooler and controllable by means of a switching valve. By means of such a bypass, the possibility is provided to bypass the EGR cooler with an activated bypass. This is desired, for example, for a cold start of the internal combustion engine to heat up the internal combustion engine as quickly as possible by means of the heat of the recirculated exhaust gases. With a hot internal combustion engine, the bypass is deactivated so that the recirculated exhaust gases then flow through the EGR cooler, thereby being cooled.

From DE 199 62 863 A1, another EGR device comprising an EGR cooler and a bypass is known. However, in this EGR device, the bypass bypasses the EGR cooler internally. This means that the bypass runs within the cooler housing, but is thermally insulated from the coolant.

SUMMARY

The present invention is concerned with the problem to provide for an EGR device of the type mentioned above an improved embodiment, which is in particular characterized by an increased variability of the adjustable cooling power of the EGR cooler.

This problem is solved according to the invention as disclosed below. Advantageous embodiments are disclosed herein below.

The invention is based on the general idea to provide in the EGR cooler two coolant tube arrangements through which a coolant can flow separately, and which are distinguished by different cooling power. The one or the first cooling tube arrangement has a smaller cooling power, and hence enables a smaller heating flow between the exhaust gas and the coolant. Unlike that, the other or the second coolant tube arrangement has a larger coolant power, and thus enables a larger heating flow between exhaust gas and coolant. By means of this construction, two separate EGR coolers with different cooling power are quasi integrated in a common housing, which results in an extremely compact construction. By means of the proposed construction of the EGR coolers, basically three different flow-through conditions are realizable. In a first flow-through condition, which is set, for example, when no cooling demand or only a low cooling demand is required, the exhaust gases are passed exclusively through the first cooling tube arrangement, which allows the lower heating flow. In a second flow-through condition, when a medium cooling demand is required, the exhaust gases are passed exclusively through the second cooling tube arrangement, which enables the higher heating flow. In a third flow-through, which is set, for example, for covering a high cooling demand, the exhaust gases flow through both coolant tube arrangements. For this it can be provided to configure the distribution of the exhaust gas flow to the two cooling tube arrangement in the third flow-through condition mobile in steps or continuously variable, whereby the cooling power provided by the EGR cooler can be adapted even better to the actual coolant demand.

In an advanced development of the EGR device, a bypass can be provided which bypasses the EGR cooler externally and which is activated when no cooling demand is required. Alternatively, in internal combustion engines, for example, which have a relatively short warm-up phase due to their construction, such a bypass can be abandoned. During the warm-up operation, the recirculated exhaust gases can be passed exclusively through the first cooling tube arrangement with the lower power. A thereby given extension of the warm-up phase compared to an embodiment comprising an external bypass, or an internal and insulated bypass, is accepted in this case.

To be able to configure the cooling power or the heating flow, respectively, between the exhaust gas and the coolant differently within the two cooling tube arrangements, a plurality of different measures are proposed, which can be realized cumulatively or alternatively. For example, the second cooling tube arrangement can have a larger surface on the exhaust gas side and/or the coolant side than the first cooling tube arrangement. The second cooling tube arrangement can have more cooling tubes than the first cooling tube arrangement. The cooling tubes of the second cooling tube arrangement can have smaller flow-through cross sections and/or higher flow-through resistances for the exhaust gas. The cooling tubes of the second cooling tube arrangement can be made of a different material than the cooling tubes of the first cooling tube arrangement and can have a higher heat transfer coefficient. In the cooling tubes of the second cooling tube arrangement, between exhaust gas and cooling tube and/or turbulators, ribs can be arranged for improvement of the heat transfer, which increase the flow resistance and the retention time of the exhaust gas in the respective cooling tube, and cause turbulences, which in each case contribute to the increase of the heat transfer between exhaust gas and cooling tube. Advantageously, the ribs can be formed as turbulators.

Further important features and advantages of the invention are apparent from the disclosure, the drawings, and tile associated description of tile figures by means of the drawings.

It is to be understood that the aforementioned and the following features still to be illustrated are not only usable in the respective mentioned combination, but also in other combinations or on its own, without departing from the scope of the present invention.

BRIEF DESCRIPTION OF THE DRAWING

Preferred exemplary embodiments of the invention are illustrated in the drawings, and are explained in the following description in more detail, wherein identical reference numbers refer to identical, or similar, or functionally identical components.

In the figures

DETAILED DESCRIPTION

Figure 1:
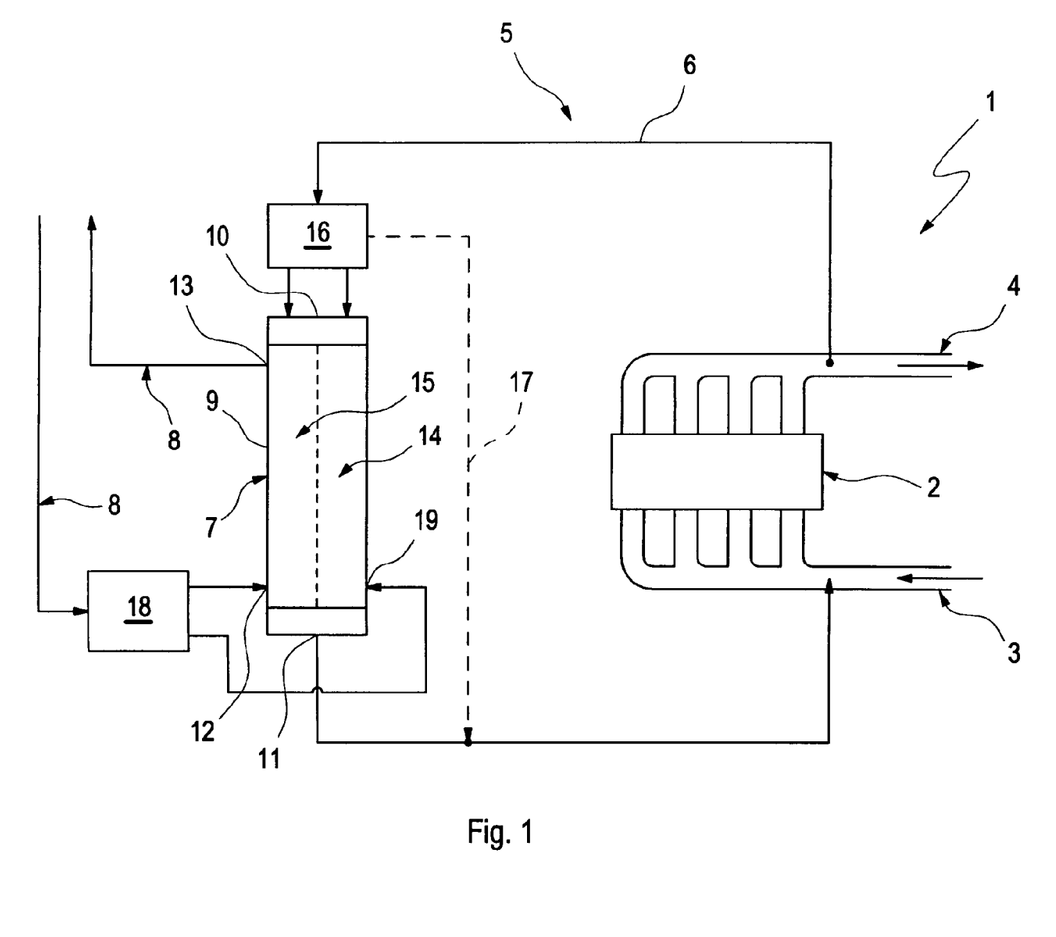
FIG. 1 shows schematically a greatly simplified diagram-like basic illustration of an internal combustion engine comprising an exhaust gas recirculation device.

According to FIG. 1, an internal combustion engine 1, which can be arranged in a motor vehicle, comprises an engine block 2 with cylinders which are not shown, a fresh gas system 3, which supplies fresh gas to the cylinders of the engine block 2, and an exhaust system 4, which discharges exhaust gas from the cylinders of the engine block 2. Furthermore, the internal combustion engine 1 is equipped with an exhaust gas recirculation device 5, which is denoted hereinafter as EGR device 5. The EGR device 5 comprises an exhaust gas recirculation line 6, which is denoted hereinafter as EGR line 6. The EGR line 6 serves for external recirculation of exhaust gas from the exhaust system 4 into the fresh gas system 3. For this, the EGR line 6 is connected, on the one hand, to the exhaust system 4, and on the other hand to the fresh gas system 3. The EGR device 5 comprises in addition an exhaust gas recirculation cooler 7, which is denoted hereinafter as EGR cooler 7. The EGR cooler is arranged in the EGR line 6 so that the exhaust gas can flow through it. The EGR cooler 7 is connected to a cooling circuit 8 which operates by means of a liquid coolant. Preferably this concerns here the same cooling circuit 8, which in the internal combustion engine 1 serves for cooling of the engine block 2. The EGR cooler 7 allows a heat-transferring coupling between coolant and exhaust gas, and comprises a cooler housing 9 through which coolant can flow and which comprises at least an exhaust gas inlet 10, an exhaust gas outlet 11, a coolant inlet 12 and a coolant outlet 13.

The EGR cooler 7 includes in its cooler housing 9 two cooling tube arrangements, in particular a first cooling tube arrangement 14 and a second cooling tube arrangement 15. Each cooling tube arrangement 14, 15 connects in the housing 9 the exhaust gas inlet 10 with the exhaust gas outlet 11, and thus allows the flow of exhaust gas through the EGR cooler 7. At the same time, the two cooling tube arrangements 14, 15 are coupled heat-transferring with the coolant passing through the cooler housing 9. The two cooling tube arrangements 14, 15 are matched to each other or formed such that the second cooling tube arrangement 15 allows a higher heating flow between the exhaust gas and the coolant under the same basic conditions than the first cooling tube arrangement 14. Same basic conditions means, in particular, the same volume flows of exhaust gas and coolant as well as the same temperature difference between exhaust gas and coolant.

The EGR device 5 comprises in addition an exhaust gas valve arrangement 16 which is arranged here at the exhaust gas inlet 10. Principally, an embodiment is thinkable which is arranged at the exhaust gas outlet 11. The exhaust gas valve arrangement 16 is formed such that it allows different switching positions. In a first switching position, it passes the exhaust gas exclusively through the first cooling tube arrangement 14. The first switching position is, for example, selected by a control, which is not shown here, of the EGR device 5 when there is only a low cooling demand for the exhaust gas to be recirculated. The first switching position can in particular also be selected when there is no cooling demand for the exhaust gas to be recirculated, which is the case, for example, during a warm-up phase of the internal combustion engine 1. In a second switching position, the exhaust gas arrangement 16 passes the recirculated exhaust gas exclusively through the second cooling tube arrangement 15. The second switching position is selected, for example, when a considerably higher or medium cooling demand is required for the exhaust gas.

The exhaust gas valve arrangement 16 preferably allows in addition the setting of at least a third switching position, in which the exhaust gas valve arrangement 16 passes the exhaust gas through both cooling tube arrangements 14, 15. This third switching position can be selected for cooling demand in the exhaust gas, which is again higher or large. Here it is basically possible to form the exhaust gas valve arrangement 16 such that within this third switching position, basically any intermediate position is adjustable, whereby the distribution of the recirculated exhaust gas flow to the two cooling tube arrangements 14, 15 is adjustable as desired between 0% and 100%, and, in particular, in steps or continuously variable.

In addition, the EGR device 5 can be equipped optionally with a bypass 17, which is only indicated here by a broken line, and which allows bypass of the EGR cooler 17 externally. For this, the exhaust gas valve arrangement 16 is preferably formed for adjusting a fourth switching position, in which it passes the recirculated exhaust gases exclusively through the bypass 17, which is particularly useful in the case when no cooling demand in the exhaust gas exists. For achieving of a particularly compact construction, this bypass 17 is preferably abandoned.

The EGR device 5 or the cooling circuit 8, respectively, can be equipped with a coolant valve arrangement 18 which allows to switch over or to distribute the coolant flow between the coolant inlet 12 and an additional connection 19, which is also connected to the housing 9, and, in particular, in steps or continuously variable between 0% and 100%. By means of the additional connection 19, in the cooler housing 9, a changed coolant flow can be realized which, for example, improves the cooling power of the first cooling tube arrangement 14. An embodiment provided with the additional connection 19 is addressed in more detail below with reference to FIG. 3. The coolant valve arrangement 18 can also be arranged in the return line of the cooling circuit 8, instead of being in the flow line, as shown here, whereby it then switches or distributes the coolant flow between the coolant outlet 13 and the additional connection 19.

Figure 2:
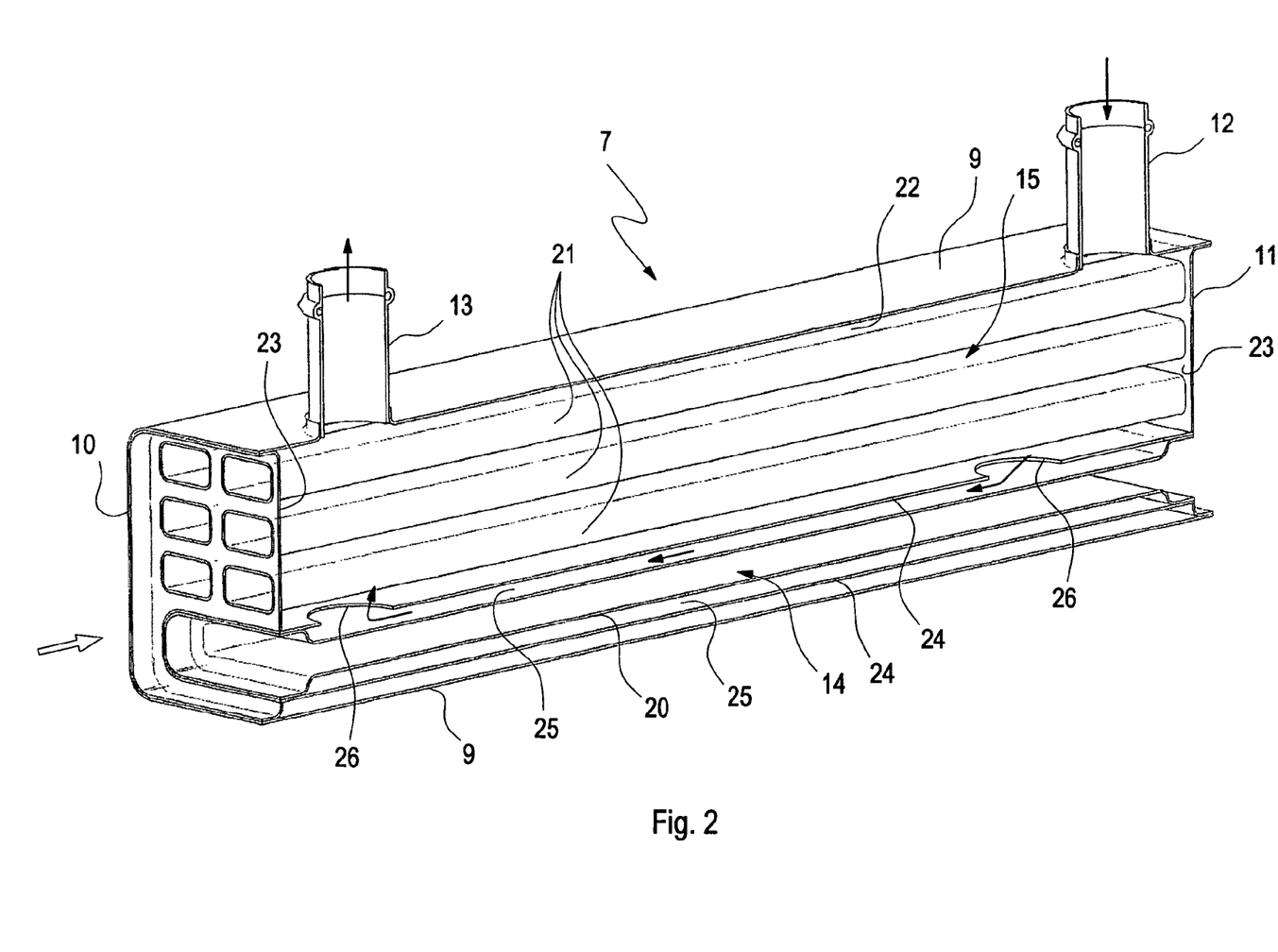
FIGS. 2 and 3 show schematically perspective longitudinal sections of an exhaust gas recirculation cooler in different embodiments.
Figure 3:
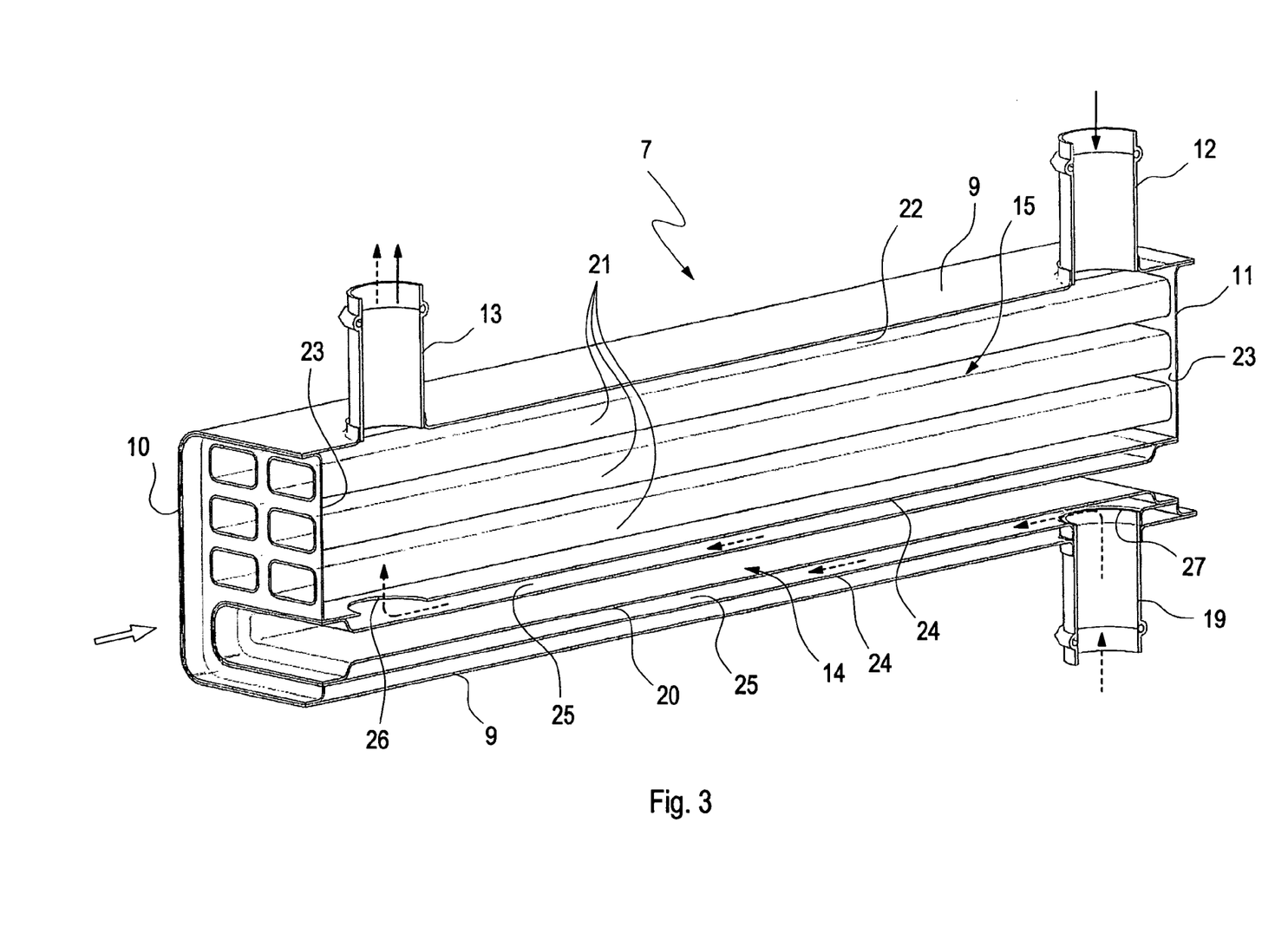

According to FIGS. 2 and 3, the first cooling tube arrangement 14, for example, is formed by a single cooling tube 20, which connects the exhaust gas inlet 10 with the exhaust gas outlet 11. Unlike this, the second cooling tube arrangement 15 is formed here by a plurality of cooling tubes 21, which also connect the exhaust gas inlet 10 with the exhaust gas outlet 11. In the present case, six parallel cooling tubes 21 are provided in the second cooling tube arrangement 15. The cooling tubes 20, 21 of the two cooling tube arrangements 14, 15 each extend straight and parallel to each other.

The cooler housing 9 encloses a cooling chamber 22, which in the embodiments of FIGS. 2 and 3 is called main cooling chamber 22. The cooling chamber 22 is bounded in the region of the exhaust gas inlet 10 and in the region of the exhaust gas outlet 11 by a bottom 23, respectively, and closed tightly. The cooling tubes 20, 21 of the two cooling tube arrangements 14, 15 run within the cooling chamber 22 and penetrate the bottoms 23.

The cooling tubes 21 of the second cooling tube arrangement 15 have, on the exhaust gas side as well as on the coolant side, in total a larger surface than the cooling tube 20 of the first cooling tube arrangement 14. Furthermore, each of them are provided with smaller flow-through cross sections than the cooling tube of the first cooling tube arrangement 14. In addition, the cooling tubes 21 of the second cooling tube arrangement hereby can have a higher flow resistance than the cooling tube 20 of the first cooling tube arrangement 14. Optionally, it can also be provided to manufacture the cooling tubes 21 of the second cooling tube arrangement 15 from a different material than the cooling tube 20 of the first cooling tube arrangement 14, such that they have a higher heat transfer coefficient. For example, the cooling tubes 21 of the second cooling tube arrangement 15 are made of aluminum or copper, while the cooling tube 20 of the first cooling tube arrangement 14 is made of stainless steel.

In the embodiments of FIGS. 2 and 3, a partition wall 24 is arranged in the cooler housing 9 in a manner that it completely encloses, but spaced apart, the cooling tube 20 of the first cooling tube arrangement 14 in circumferential direction, thus transverse to the longitudinal direction of this cooling tube 20, so that between the partition wall 24 and said cooling tube 20, an additional cooling chamber 25 is formed, which completely encloses the cooling tube 20 of the first cooling tube arrangement 14 in circumferential direction. The partition wall 24 thereby separates the additional cooling chamber 25 within the cooler housing 9 from the remaining cooling chamber 22 or main cooling chamber 22, respectively. However, this separation is not complete since the partition wall 24 includes at least one opening 26 through which the additional cooling chamber 25 communicates with the main cooling chamber 22. In this manner, the coolant can flow through the additional cooling chamber 25 as well. The cooling tube 20 of the first cooling tube arrangement 14 hence extends within the additional cooling chamber 25, while the cooling tubes 21 of the second cooling tube arrangement 15 extend within the main cooling chamber 22. The partition wall 24 causes a systematic restriction of the flushing around the cooling tube 20 in the first cooling tube arrangement 14 compared to the flushing of the cooling tubes 21 of the second cooling tube arrangement 15. The partition wall 24 is hence a measure for the realization of a reduced cooling power for the first cooling tube arrangement 14.

In the embodiment shown here, the arrangement of the partition wall 24 and the cooling tube 20 enclosed thereof within the cooler housing 9 is carried out such that the main cooling chamber 22 also encloses the partition wall 24, and hence the additional cooling chamber 25 in circumferential direction. Consequently, the partition wall 24 is flushed from all sides in circumferential direction by the coolant. Thereby a uniform cooling within the cooling tube 20 of the first cooling tube arrangement 14 is improved. In a different embodiment, the partition wall 24 can be arranged in the cooler housing 9 such that it separates, like an intermediate bottom, the additional cooling chamber 25 from the main cooling chamber 22, whereby it then also allows communication through at least one opening 26 between the two cooling chambers 22, 25. The additional cooling chamber 25 in this case is not arranged within the main cooling chamber 22 but quasi in parallel thereto.

In the embodiment shown in FIG. 2, the partition wall 24 includes at least two such openings 26, which are arranged with respect to the flow of coolant through the housing 9 such that they form at least one inlet opening and at least one outlet opening for coolant. The flow-through of the additional cooling chamber 25 is indicated by arrows.

In the embodiment illustrated in FIG. 3, the partition wall 24 has, in addition to the at least one opening 26, another opening 27, which is connected to the additional connection 19 mentioned above with respect to FIG. 1. The additional connection 19 connected to the cooling circuit 8 extends through the cooler housing 9 and is connected to the additional cooling chamber 25. Thereby the additional connection 19 penetrates the main cooling chamber 22 at least partially. The coolant valve arrangement 18 mentioned with respect to FIG. 1, which is connected with the additional connection 19, and, for example, with the coolant inlet 12, can be formed such that it allows a first switching position in which the coolant exclusively flows in through the coolant inlet 12 and flows out through the coolant outlet 13; compare to the arrows drawn with solid lines. Furthermore, it can realize a second switching position in which the coolant, according to the arrows drawn with a broken line, exclusively flows in through the additional connection 19 and flows out through the coolant outlet 13. Alternatively, in the second switching position, the flow can also take place such that the coolant exclusively flows in through the coolant inlet 12 and flows out through the additional connection 19. Furthermore, it is also principally possible to form the coolant valve arrangement 18 such that it allows a third switching position, in which the coolant flows in through the coolant inlet 12 and flows out through the coolant outlet 13, as well as through the additional connection 19. In addition, alternatively, a switching configuration is possible in which the coolant flows in through the coolant inlet 12 and the additional connection 19 and flows out through the coolant outlet 13. Thinkable is also a bypass for the coolant, which is not shown here, bypassing an EGR cooler 7 internally or externally, wherein the coolant valve arrangement 18 then passes the coolant in a further, or fourth, switching position through said bypass.

Figure 4:
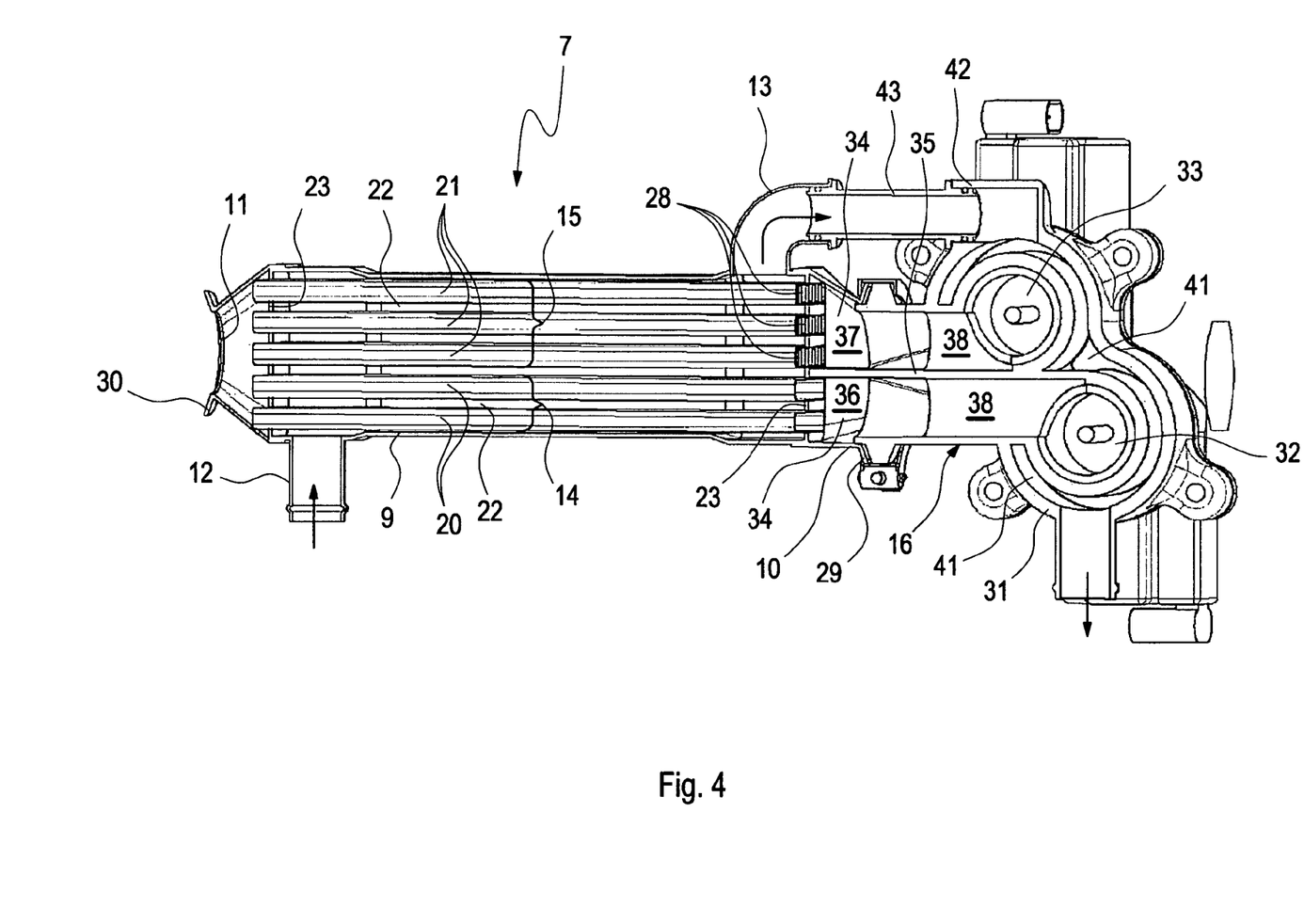
FIGS. 4 and 5 show schematically perspective longitudinal sections of another exhaust gas recirculation device comprising an exhaust gas valve arrangement in different viewing directions and sectional planes.
Figure 5:
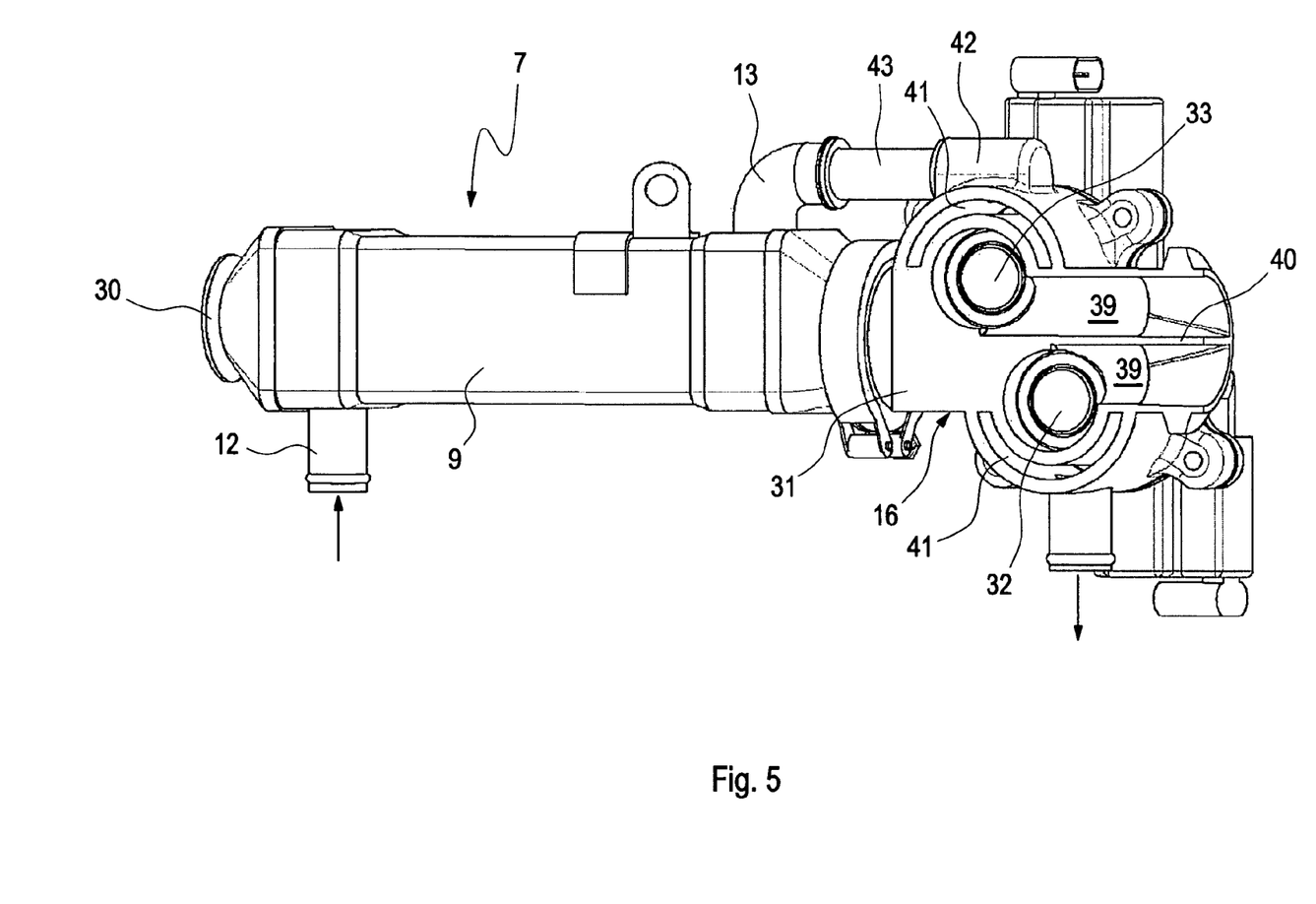

In the embodiment shown in FIGS. 4 and 5, the cooling tubes 20, 21 of the two cooling tube sections 14, 15 are formed as identical parts. Hereby this embodiment is built more cost effective. To improve the efficiency of the second cooling tube arrangement 15 compared to the first cooling tube arrangement 14, more cooling tubes 21 are allocated here to the second cooling tube arrangement 15 than to the first cooling tube arrangement 14. Without restriction of the generality, the first cooling tube arrangement 14 comprises here two cooling tubes 20, while the second cooling tube arrangement 15 comprises three cooling tubes 21. Furthermore, the cooling tubes 21 of the second cooling tube arrangement 15 are equipped with ribs and/or turbulators 28 in their interior, which result in a known manner in an extreme improvement of the heat transfer between the exhaust gas and the cooling tubes 21. Unlike this, the cooling tubes 20 of the first cooling tube arrangement 14 preferably include neither ribs nor turbulators.

The measures for realizing different heating flows in the two cooling tube arrangements 14, 15 in the embodiment shown in FIGS. 4 and 5 and in the embodiment shown in FIGS. 2 and 3 can be combined with each other as desired.

With reference to FIGS. 4 and 5, hereinafter a special embodiment of the exhaust gas valve arrangement 16 is explained in more detail.

According to FIGS. 4 and 5, the cooler housing 9 has on the inlet side an inlet flange 29, which forms the exhaust gas inlet 10, and through which, in the present case, the exhaust gas valve arrangement 16 is connected. The cooler housing 9 includes in addition an outlet flange 30, which forms the exhaust gas outlet 11, and through which the cooler housing 9 is connectable to the EGR line 6. In an alternative embodiment, the exhaust gas valve arrangement 16 can also be arranged accordingly on the outlet side.

The exhaust gas valve arrangement 16 comprises a valve housing 31, which is formed, for example, as a metal casting. In this valve housing 31, two control valves are arranged, namely a first control valve 32 and a second control valve 33. The first control valve 32 controls the exhaust gas flow through the first cooling tube arrangement 14, while the second control valve 33 controls the exhaust gas flow through the second cooling tube arrangement 15. The two control valves 32, 33 are preferably built identical (identical parts) and can are mobile between a maximum open position and a closed position, wherein they can realize, in particular, one or more intermediate positions to allow a stepped or even continuously variable switching between the closed position and the open position. Thus, the control valves 32, 33 are not considered switching valves, which can be switched over exclusively between a closed position and an open position.

According to FIG. 4, the cooler housing 9 comprises an exhaust gas inlet chamber 34 which is separated by an inlet-side bottom 23 from the coolant in the cooling chamber 22, and which is located in the region of the exhaust gas inlet 10. The exhaust gas valve arrangement 16 or its valve housing 31, respectively, is equipped with a dividing wall 35, which extends parallel to the flow direction, and hence parallel to the cooling tubes 20, 21, and thereby extends up to or close to the said bottom 23. The dividing wall 35 divides the exhaust gas inlet chamber 34 into a first sub-chamber 36, which communicates with the first cooling tube arrangement 14, and into a second sub-chamber 37, which communicates with the second cooling tube arrangement 15. A fixed connection of the dividing wall 35 to the bottom 23 is not required. Leakages which might occur can be tolerated. The dividing wall 35 projects into a gap, which is formed between the free ends of the two adjacent tubes 20, 21 of the two cooling tube arrangements 14, 15.

The dividing wall 35 of the valve housing 31 extends also within the valve housing 31, namely within an exhaust gas discharge 38, which is directed away from the two control valves 32, 33 and is directed towards the exhaust gas inlet 10 of the cooler housing 9. Hereby, a separate flow conduction within the common valve housing for the exhaust gas is realized from the control valves 32, 33 to the exhaust gas inlet 10 and through the dividing wall 35, which is extended up to the inlet-side bottom 23, and additionally to the two cooling tube arrangements 14, 15.

According to FIG. 5, the valve housing 31 comprises in addition exhaust gas inflow 39, which is connectable to the EGR line 6, and which supplies the exhaust gas to the two control valves 32, 33. For this, in the exhaust gas inflow 39, a dividing wall 40 can be arranged, which allows a separate flow conduction for the exhaust gas within the exhaust gas inflow 39 up to the respective control valve 32, 33. By means of the two dividing walls 35, 40, in the valve housing 31, two completely separated flow paths are realized, whereby the one of them is controllable with the first control valve 32, and the other one is controllable separately by the second control valve 33.

According to FIGS. 4 and 5, the valve housing 31 comprises a cooling jacket 41, which is integrated in the cooling circuit 8. For this, an inlet port 42 formed at the valve housing 31 and the coolant outlet 13 of the cooler housing 9 are connected with each other via a connection piece 43. If the exhaust gas valve arrangement 16 is arranged on the flow-off side with respect to the EGR cooler 7, such a liquid cooling of the valve housing can be eliminated.

The invention claimed is:

1. An exhaust gas recirculation device for an internal combustion engine comprising:
    an exhaust gas recirculation line for externally recirculating exhaust gas from an exhaust gas side of the internal combustion engine into a fresh gas side of the internal combustion engine,
    a cooling circuit operating with a liquid coolant;
    an exhaust gas recirculation cooler, which is built in the exhaust gas recirculation line and which is connected to the cooling circuit;
    a cooler housing included in the exhaust gas recirculation cooler, where the cooler housing comprises at least an exhaust gas inlet, an exhaust gas outlet, a coolant inlet, and a coolant outlet, and through which coolant flows;
    a first cooling tube arrangement included in the cooler housing of the exhaust gas recirculation cooler, the first cooling tube arrangement comprising at least one cooling tube connecting the exhaust gas inlet with the exhaust gas outlet; and
    a second cooling tube arrangement comprising at least one cooling tube connecting the exhaust gas inlet with the exhaust gas outlet, wherein at least one cooling tube of the second cooling tube arrangement includes at least one of having a higher heat transfer coefficient material than each cooling tube in the first cooling tube arrangement, having a smaller flow-through cross section on the exhaust side than the at least one cooling tube of the first cooling tube arrangement on the exhaust side, and having a higher flow-through resistance than the at least one cooling tube of the first cooling tube arrangement; and
    wherein the first and the second cooling tube arrangements are formed such that the second cooling tube arrangement allows a higher heating flow between exhaust gas and coolant than the first cooling tube arrangement.

2. The exhaust gas recirculation device according to claim 1, wherein an exhaust gas valve arrangement is provided, which is arranged at one of the exhaust gas inlet and the exhaust gas outlet, and which is formed such that the exhaust gas flows in a first switching position of the exhaust gas valve arrangement only through the first cooling tube arrangement, and in a second switching position of the exhaust gas valve arrangement only through the second cooling tube arrangement, and includes at least one of the following:
    i. that the exhaust gas valve arrangement is formed such that the exhaust gas in a third switching position of the exhaust gas valve arrangement flows through both cooling tube arrangements, and
    ii. that the exhaust gas valve arrangement is formed such that the exhaust gas in a fourth switching position of the exhaust gas valve arrangement flows only through a bypass, bypassing the exhaust gas recirculation cooler one of internally and externally, and
    iii. that the exhaust gas valve arrangement is formed such that the exhaust gas valve arrangement is mobile between its individual switching positions, and includes at least one of at least one intermediate step and is continuously variable.

3. The exhaust gas recirculation device according to claim 1, wherein the cooling tubes of the cooling tube arrangements are formed as identical parts, wherein one of the cooling tube and the cooling tubes of the second cooling tube arrangement are provided additionally with at least one of ribs and turbulators.

4. The exhaust gas recirculation device according to claim 1, wherein the cooler housing, on the exhaust gas inlet side, includes a bottom which is penetrated by the cooling tubes of the two cooling tube arrangements and which separates an exhaust gas inlet chamber from the coolant, wherein an exhaust gas valve arrangement provided for the distribution of the exhaust gas to at least one of the first cooling tube arrangement and the second cooling tube arrangement is connected to the exhaust gas inlet, wherein the exhaust gas valve arrangement comprises a dividing wall which extends one of up to the bottom and adjacent to the bottom, and which, in the exhaust gas inlet chamber, separates a first sub-chamber communicating with the first cooling tube arrangement from a second sub-chamber communicating with the second cooling tube arrangement.

5. The exhaust gas recirculation device according to claim 4, wherein in the cooler housing, a common cooling chamber is formed through which coolant flows, through which the cooling tubes of the two cooling tube arrangements run through, and which, towards the exhaust gas inlet and the exhaust gas outlet, is bounded by a respective bottom.

6. The exhaust gas recirculation device according to claim 2, wherein the exhaust gas valve arrangement comprises two control valves, and includes at least one of the following features:
   i. each of the two control valves is one of mobile in steps and continuously variable in a closed position, in an open position, and in at least one intermediate positions, of which a first control valve controls the exhaust gas flow through the first cooling tube arrangement, and of which a second control valve controls the exhaust gas flow through the second cooling tube arrangement, and
   ii. the two control valves are arranged in a common valve housing, which comprises an exhaust gas inflow directed towards the two control valves and an exhaust gas discharge directed away from the two control valves, wherein in at least one of the exhaust gas inflow and in the exhaust gas discharge, a dividing wall is arranged, which directs the exhaust gas in the valve housing to at least one of separately towards the control valves, and separately away from the control valves, and
   iii. that the valve housing comprises a cooling jacket, which is integrated in the cooling circuit.

7. The exhaust gas recirculation device according to claim 1, wherein at least one of the following is selected:
   i. one of the first cooling tube arrangement, the one cooling tube of the first cooling tube arrangement, and each cooling tube of the first cooling tube arrangement is enclosed in a circumferential direction by a partition wall such that the partition wall encloses in the circumferential direction an additional cooling chamber which surrounds the selected respective cooling tubes in the circumferential direction, wherein the partition wall includes at least one opening through which the additional cooling chamber communicates with a main cooling chamber, which is enclosed by the cooler housing and through which coolant flows, and in which at least one cooling tube of the second cooling tube arrangement run, and
   ii. that in the cooler housing, a partition wall separates a main cooling chamber through which coolant flows, and the main cooling chamber encloses the respective partition wall and the respective additional cooling chamber in the circumferential direction, so that on the partition wall enclosing the additional cooling chamber, coolant is applied from all sides in a circumferential direction.

8. The exhaust gas recirculation device according to claim 1, wherein the cooler housing, on the exhaust gas outlet side, includes a bottom, which is penetrated by the cooling tubes of the first and second cooling tube arrangements, and which separates an exhaust gas outlet chamber from the coolant, wherein an exhaust gas valve arrangement provided for the distribution of the exhaust gas to at least one of the first cooling tube arrangement and the second cooling tube arrangement is connected to the exhaust gas outlet, wherein the exhaust gas valve arrangement comprises a dividing wall which extends one of up to the bottom and adjacent the bottom, and which, in the exhaust gas outlet chamber, separates a first sub-chamber communicating with the first cooling tube arrangement from a second sub-chamber communicating with the second cooling tube arrangement.

9. The exhaust gas recirculation device according to claim 2, wherein at least one of at least one turbulator and at least one rib is arranged in at least one of the cooling tubes of the second cooling tube arrangement, and in each cooling tube of the first cooling tube arrangement there is an absence of the turbulators and the ribs.

10. The exhaust gas recirculation device according to claim 2, wherein in the cooler housing, a partition wall separates a main cooling chamber, through which coolant flows and in which at least one cooling tube of the second cooling tube arrangement run, from an additional cooling chamber, in which at least one cooling tube of the first cooling tube arrangement run, wherein at least one of the following is selected:
   i. the partition wall includes at least one opening, through which the additional cooling chamber communicates with the main cooling chamber, and
   ii. that the main cooling chamber encloses the respective partition wall and the respective additional cooling chamber in a circumferential direction, so that on the partition wall enclosing the additional cooling chamber, coolant can be applied from all sides in the circumferential direction.

11. An internal combustion engine exhaust gas recirculation device, comprising:
   an exhaust gas recirculation line, the recirculation line externally recirculating exhaust gas from an exhaust gas side into a fresh gas side;
   a cooling circuit operating with a liquid coolant;
   an exhaust gas recirculation cooler, configured in the exhaust gas recirculation line, the cooler is connected to the cooling circuit,
   a cooler housing configured in the cooler, the cooler housing includes at least an exhaust gas inlet, an exhaust gas outlet, a coolant inlet, and a coolant outlet, wherein the coolant flows through the coolant inlet and coolant outlet, the cooler housing further including a first cooling tube arrangement, the first cooling tube arrangement comprising at least one cooling tube connecting the exhaust gas inlet with the exhaust gas outlet, and a second cooling tube arrangement comprising at least one cooling tube connecting the exhaust gas inlet with the exhaust gas outlet,
   wherein the first and the second cooling tube arrangements are formed such that the second cooling tube arrangement allows a higher heating flow between exhaust gas and coolant than the first cooling tube arrangement; and
   wherein at least one of at least one turbulator and at least one rib is arranged in at least one of the cooling tubes of the second cooling tube arrangement, and in each cooling tube of the first cooling tube arrangement there is an absence of the turbulators and the ribs.

12. The exhaust gas recirculation device according to claim 11, wherein at least one of the following features:
the second cooling tube arrangement comprises at least one of a larger surface on the exhaust gas side, and a coolant side than the first cooling tube arrangement;
the second cooling tube arrangement comprises more cooling tubes than the first cooling tube arrangement;
the respective cooling tube of the second cooling tube arrangement has on the exhaust gas side a smaller flow-through cross section than the respective cooling tube of the first cooling tube arrangement;
at least one cooling tube of the second cooling tube arrangement includes a material having a higher heat transfer coefficient than the material of at least one cooling tube of the first cooling tube arrangement; and
at least one cooling tube of the second cooling tube arrangement comprise on the exhaust side a higher flow-through resistance than at least one cooling tube of the first cooling tube arrangement.

13. An exhaust gas recirculation device, comprising:
an exhaust gas recirculation line, the recirculation line externally recirculating exhaust gas from an exhaust gas side into a fresh gas side;
a cooling circuit operating with a liquid coolant;
an exhaust gas recirculation cooler, configured in the exhaust gas recirculation line, the cooler is connected to the cooling circuit,
a cooler housing configured in the cooler, the cooler housing includes at least an exhaust gas inlet, an exhaust gas outlet, a coolant inlet, and a coolant outlet, wherein the coolant flows through the coolant inlet and coolant outlet, the cooler housing further including a first cooling tube arrangement, the first cooling tube arrangement comprising at least one cooling tube connecting the exhaust gas inlet with the exhaust gas outlet, and a second cooling tube arrangement comprising at least one cooling tube connecting the exhaust gas inlet with the exhaust gas outlet,
wherein the first and the second cooling tube arrangements are formed such that the second cooling tube arrangement allows a higher heating flow between exhaust gas and coolant than the first cooling tube arrangement; and
wherein a partition wall separates a main cooling chamber from an additional cooling chamber, wherein coolant flows and at least one cooling tube of the second cooling tube arrangement extends through the main cooling chamber, and wherein at least one cooling tube of the first cooling tube arrangement extends through the additional cooling chamber, wherein at least one of the following is selected:
i. the partition wall includes at least one opening, through which the additional cooling chamber communicates with the main cooling chamber, and
ii. that the main cooling chamber encloses the respective partition wall and the respective additional cooling chamber in a circumferential direction, so that on the partition wall enclosing the additional cooling chamber, coolant can be applied from all sides in the circumferential direction.

14. The exhaust gas recirculation device according to claim 13, wherein the partition wall further includes at least a second opening, where the at least one opening and the second opening forms at least one inlet opening and at least one outlet opening.

15. The exhaust gas recirculation device according to claim 13, wherein at least one of the following features is included:
that the partition wall comprises at least one further opening through which an additional connection connected to the cooling circuit is connected through the cooler housing to the additional cooling chamber,
that the additional connection penetrates at least a portion of the main cooling chamber,
that a coolant valve arrangement is provided, which is connected with the additional connection and with one of the coolant inlet and the coolant outlet, and is formed such that the coolant, in a first switching position, flows in only through the coolant inlet and flows out only through the coolant outlet, and, in a second switching position, is one of flowing in only through the coolant inlet and flows out through the additional connection, and flowing in only through the additional connection and flows out through the coolant outlet,
that the coolant valve arrangement is formed such that the coolant, in a third switching position, is one of flowing in through the coolant inlet and flows out through the coolant outlet and through the additional connection, and flowing in through the coolant inlet and through the additional connection and flows out through the coolant outlet,
that the coolant valve arrangement is formed such that the coolant, in a fourth switching position, flows through one of a bypass internally and a bypass externally, bypassing the exhaust gas recirculation cooler, and
that the coolant valve arrangement is formed such that, between its respective switching steps is one of stepped via at least one intermediate step, and is continuously variable.

16. An exhaust gas recirculation cooler for an exhaust gas recirculation device of an internal combustion engine, comprising:
an exhaust gas recirculation cooler;
an exhaust gas recirculation line for external recirculation of exhaust gas from an exhaust gas side of the internal combustion engine to a fresh gas side of the internal combustion engine, where the exhaust gas recirculation cooler is connected to the exhaust gas recirculation line;
a cooling circuit operating with a liquid coolant, wherein the exhaust gas recirculation cooler is connected to the cooling circuit;
a cooler housing which is part of the exhaust gas recirculation cooler and comprises at least an exhaust gas inlet, an exhaust gas outlet, a coolant inlet, and a coolant outlet, and through which coolant flows,
a first cooling tube arrangement included in the cooler housing and comprising at least one cooling tube connecting the exhaust gas inlet with the exhaust gas outlet, and a second cooling tube arrangement comprising at least one cooling tube connecting the exhaust gas inlet with the exhaust gas outlet,
wherein the cooling tube arrangements are formed such that the second cooling tube arrangement allows a higher heating flow between exhaust gas and coolant than the first cooling tube arrangement; and
wherein at least one of at least one turbulator and at least one rib is arranged in at least one of the cooling tubes of the second cooling tube arrangement, and in each cooling tube of the first cooling tube arrangement there is an absence of the turbulators and the ribs.

17. The exhaust gas recirculation cooler according to claim 16, wherein at least one of the following features is included:
the respective cooling tube of the second cooling tube arrangement has on the exhaust gas side a smaller flow-through cross section than the respective cooling tube of the first cooling tube arrangement;

at least one of the cooling tubes of the second cooling tube arrangement includes a material having a higher heat transfer coefficient than the material of at least one of the cooling tubes of the first cooling tube arrangement; and at least one of the cooling tubes of the second cooling tube arrangement comprise on the exhaust side a higher flow-through resistance than at least one of the cooling tubes of the first cooling tube arrangement.

18. An exhaust gas recirculation cooler for an exhaust gas recirculation device of an internal combustion engine, comprising:

an exhaust gas recirculation cooler;

an exhaust gas recirculation line for external recirculation of exhaust gas from an exhaust gas side of the internal combustion engine to a fresh gas side of the internal combustion engine, where the exhaust gas recirculation cooler is connected to the exhaust gas recirculation line;

a cooling circuit operating with a liquid coolant, wherein the exhaust gas recirculation cooler is connected to the cooling circuit;

a cooler housing which is part of the exhaust gas recirculation cooler and comprises at least an exhaust gas inlet, an exhaust gas outlet, a coolant inlet, and a coolant outlet, and through which coolant flows, a first cooling tube arrangement included in the cooler housing and comprising at least one cooling tube connecting the exhaust gas inlet with the exhaust gas outlet, and a second cooling tube arrangement comprising at least one cooling tube connecting the exhaust gas inlet with the exhaust gas outlet, wherein the cooling tube arrangements are formed such that the second cooling tube arrangement allows a higher heating flow between exhaust gas and coolant than the first cooling tube arrangement, wherein a partition wall separates a main cooling chamber from an additional cooling chamber, wherein coolant flows and at least one cooling tube of the second cooling tube arrangement extends through the main cooling chamber, and wherein at least one cooling tube of the first cooling tube arrangement extends through the additional cooling chamber, wherein at least one of the following is selected:

i. the partition wall includes at least one opening, through which the additional cooling chamber communicates with the main cooling chamber, and ii. that the main cooling chamber encloses the respective partition wall and the respective additional cooling chamber in a circumferential direction, so that on the partition wall enclosing the additional cooling chamber, coolant can be applied from all sides in the circumferential direction.

\* \* \* \* \*